United States Patent
Creed et al.

(10) Patent No.: US 12,366,985 B1
(45) Date of Patent: Jul. 22, 2025

(54) CUSTOMER INFORMED COMPOSABLE CORE MATRIX FOR SUSTAINABLE SERVICE LEVELS

(71) Applicant: Dell Products L.P., Hopkinton, MA (US)

(72) Inventors: John Creed, Innishannon (IE); Ramesh Doddaiah, Westborough, MA (US); Evan Barry, Midleton (IE)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/660,274

(22) Filed: May 10, 2024

(51) Int. Cl.
*G06F 3/00* (2006.01)
*G06F 3/06* (2006.01)

(52) U.S. Cl.
CPC .......... *G06F 3/0644* (2013.01); *G06F 3/0608* (2013.01); *G06F 3/067* (2013.01)

(58) Field of Classification Search
CPC ....... G06F 3/0544; G06F 3/0608; G06F 3/067
See application file for complete search history.

(56) References Cited

U.S. PATENT DOCUMENTS

| | | | | |
|---|---|---|---|---|
| 2003/0204758 A1* | 10/2003 | Singh | ................... | G06F 1/3203 713/320 |
| 2008/0295096 A1* | 11/2008 | Beaty | ................. | G06Q 30/0202 718/1 |
| 2014/0173591 A1* | 6/2014 | Lin | .................... | G06F 9/45533 718/1 |
| 2022/0353267 A1* | 11/2022 | Kundu | .................. | H04L 63/102 |

\* cited by examiner

*Primary Examiner* — Craig S Goldschmidt
(74) *Attorney, Agent, or Firm* — Anderson Gorecki LLP

(57) ABSTRACT

A storage system is configured with pools of processor cores. Each pool corresponds uniquely to one of the supported service levels of the storage system. In a dynamic time series forecast adjustment mode, processor cores within each pool run at a clock speed that is statically defined for the service level corresponding to the respective pool and core affiliations with pools are dynamically adjusted based on modelled data access latency. During a scheduled event, an event guided core matrix profile overrides the time series forecast adjusted core matrix profile. The event guided core matrix profile includes core clock speeds and pool affiliations, thereby enabling rapid reconfiguration.

20 Claims, 12 Drawing Sheets

**Time Series Guided
Service Level Core Profile
202**

| SL | Mhz | Tgt MS | IOPS/core | Watts |
|---|---|---|---|---|
| Diamond | 3000 | 0.1 | 10000 | 6.25 |
| Platinum | 2400 | 0.2 | 5000 | 3.13 |
| Gold | 2000 | 0.6 | 1667 | 1.04 |
| Silver | 1400 | 1.2 | 833 | 0.52 |
| Bronze | 1000 | 2.5 | 400 | 0.25 |

**Event Guided
Service Level Core Profiles
204**

| SL | Mhz (Perf/Pwr) | TgtMS (Perf/Pwr) | IOPS/Core (Perf/Pwr) | Watts (Perf/Pwr) |
|---|---|---|---|---|
| Diamond | 24:3000/12:1000 | 0.1/2.5 | 10000/400 | 6.25/0.25 |
| Platinum | 6:3000/6:1000 | 0.1/2.5 | 10000/400 | 6.25/0.25 |
| Gold | 6:3000/6:1000 | 0.1/2.5 | 10000/400 | 6.25/0.25 |
| Silver | 6:3000/6:1000 | 0.1/2.5 | 10000/400 | 6.25/0.25 |
| Bronze | 12:3000/24:1000 | 0.1/2.5 | 10000/400 | 6.25/0.25 |

Figure 3

CUSTOMER INFORMED COMPOSABLE CORE MATRIX FOR SUSTAINABLE SERVICE LEVELS

TECHNICAL FIELD

The subject matter of this disclosure is generally related to data storage systems.

BACKGROUND

Storage arrays, storage area networks (SANs), network-attached storage (NAS), and other types of data storage systems can be used to maintain data sets for multi-client host applications that run on clusters of host servers. Examples of the host applications may include, but are not limited to, software for email, accounting, manufacturing, inventory control, and a wide variety of other business processes. The data storage systems include extensive processing, memory, and storage resources that can consume a significant amount of electrical power. Additional electrical power is consumed by cooling systems that are needed because of heat generated by operation of the servers and data storage systems in close proximity.

SUMMARY

A method in accordance with some embodiments comprises: using time series forecasts to dynamically adjust allocations of processor cores to pools in a storage system such that the processor cores within each of the pools run at a clock speed defined for a service level corresponding to the respective pool; and overriding time-series forecast adjusted allocations of the processor cores to the pools during a scheduled event by configuring the processor cores according to an event guided service level core profile.

An apparatus in accordance with some embodiments comprises: a storage system comprising at least one compute node configured to manage access to at least one non-volatile drive, the compute node comprising hardware resources including multi-core processors and memory, the storage system configured with a plurality of pools of processor cores, each pool corresponding uniquely to a supported service level of the storage system; and a core matrix controller adapted to: use time series forecasts to dynamically adjust allocations of processor cores to pools in a storage system such that the processor cores within each of the pools run at a clock speed defined for a service level corresponding to the respective pool; and override time-series forecast adjusted allocations of the processor cores to the pools during a scheduled event by configuring the processor cores according to an event guided service level core profile.

In accordance with some embodiments, a non-transitory computer-readable storage medium stores instructions that when executed by a computer perform a method comprising: using time series forecasts to dynamically adjust allocations of processor cores to pools in a storage system such that the processor cores within each of the pools run at a clock speed defined for a service level corresponding to the respective pool; and overriding time-series forecast adjusted allocations of the processor cores to the pools during a scheduled event by configuring the processor cores according to an event guided service level core profile.

This summary is not intended to limit the scope of the claims or the disclosure. All examples, embodiments, aspects, implementations, and features can be combined in any technically possible way. Method and process steps may be performed in any order.

BRIEF DESCRIPTION OF THE FIGURES

FIG. 3 illustrates a time series guided service level core profile and event guided service level core profiles.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features such as, for example, and without limitation, tangible features. The term "physical" refers to tangible features that possibly include, but are not limited to, electronic hardware. For example, multiple virtual computers could operate simultaneously on one physical computer. The term "logic," if used, refers to special purpose physical circuit elements, firmware, software, computer instructions that are stored on a non-transitory computer-readable medium and implemented by multi-purpose tangible processors, and any combinations thereof. Embodiments are described in the context of a data storage system that includes host servers and storage arrays. Such embodiments are not limiting.

Some embodiments, aspects, features, and implementations include machines such as computers, electronic components, optical components, and processes such as computer-implemented procedures and steps. The computer-implemented procedures and steps are stored as computer-executable instructions on a non-transitory computer-readable medium. The computer-executable instructions may be executed on a variety of tangible processor devices, i.e., physical hardware. For practical reasons, not every step, device, and component that may be part of a computer or data storage system is described herein. Those steps, devices, and components are part of the knowledge generally available to those of ordinary skill in the art. The corresponding systems, apparatus, and methods are therefore enabled and within the scope of the disclosure.

Figure 1:
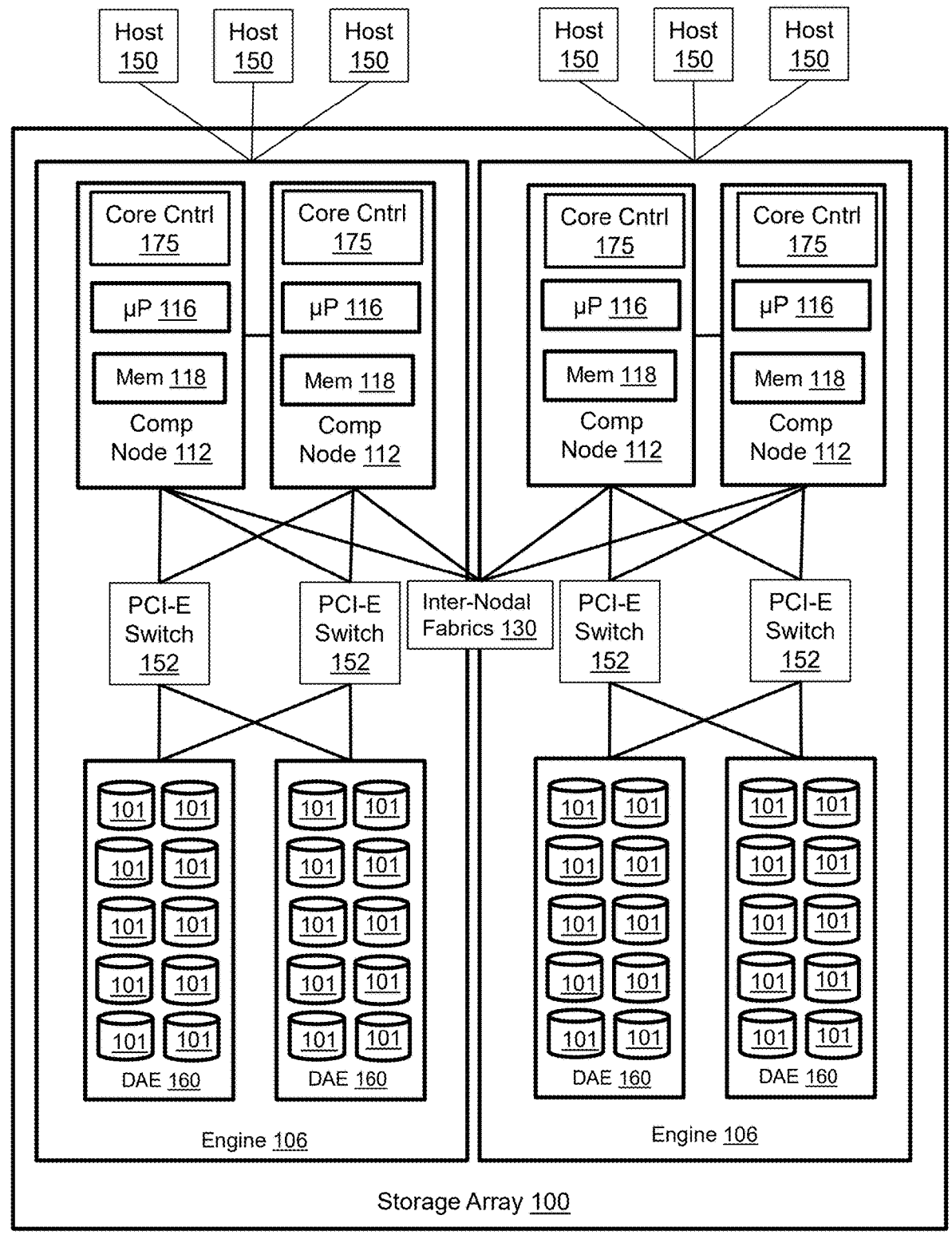
FIG. 1 illustrates a storage system with core matrix controllers that configure processor cores based on time series forecasts and scheduled events.

FIG. 1 illustrates a storage system with core matrix controllers 175 that configure processor cores based on time series forecasts and scheduled events. Different host applications have different data access requirements in terms of latency. A storage system with processor cores having dynamically adjustable clock speed is configured with different service levels corresponding to the data access requirements of the supported host applications. As will be explained below, core matrix controllers 175 allocate individual processors cores to pools that are defined by different clock speeds and associated with the service levels. For example, pools for supporting lower performing service levels may have processor cores configured to operate at reduced clock speed, thereby reducing power consumption relative to pools for supporting the highest performing service levels that are configured to operate at maximum clock speed. Allocations of cores to the pools are periodically adjusted based on forecast IOPS demand per service level to help maintain compliance with service level requirements as demand changes. Special processor core configurations, e.g., to emphasize performance or power savings, are implemented during scheduled events that are unlikely to be forecasted using time series analysis.

The specifically illustrated storage system is a storage array 100, but other types of storage systems could be used with autonomous core matrix control. Storage array 100 is shown with two engines 106 but might include any number of engines. Each engine includes disk array enclosures (DAEs) 160 and a pair of peripheral component interconnect express (PCI-E) interconnected compute nodes 112 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board (PCB) and includes resources such as multi-core processors 116 and local memory IC chips 118. Processors 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array using direct memory access. Each compute node includes one or more adapters and ports for communicating with host servers 150 to service IOs from the host servers. Each compute node also includes one or more adapters for communicating with other compute nodes via redundant inter-nodal channel-based InfiniBand fabrics 130. The core matrix controllers 175 may include software stored on the managed drives and memory, software running on the processors, hardware, firmware, and any combinations thereof.

Figure 2:
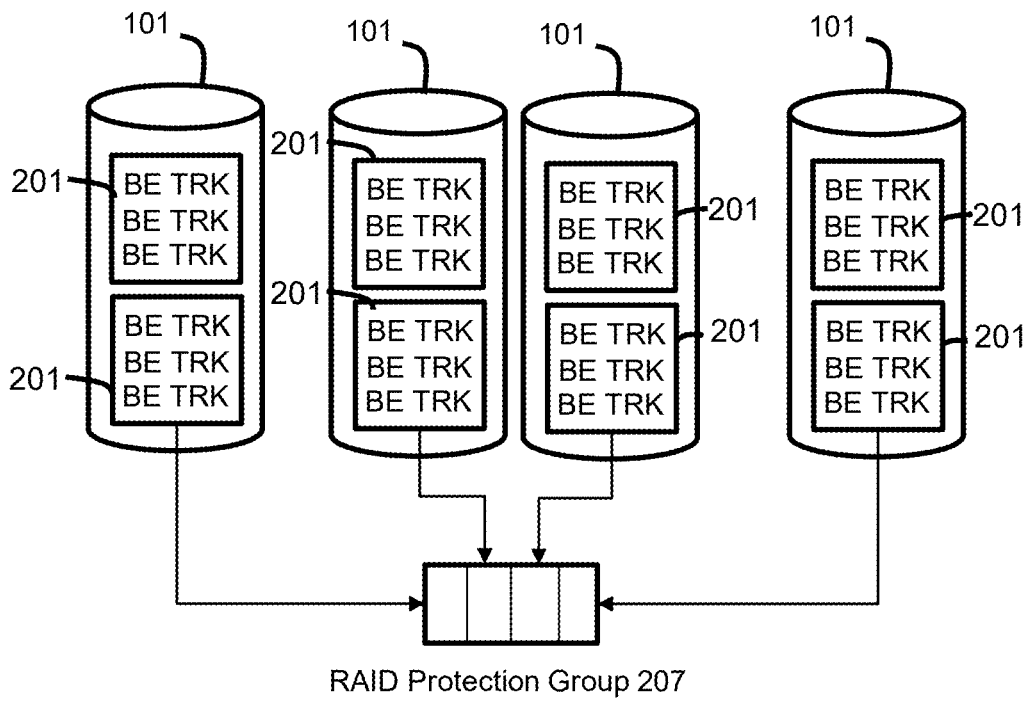
FIG. 2 illustrates storage object abstraction of the managed drives.
Figure 2:
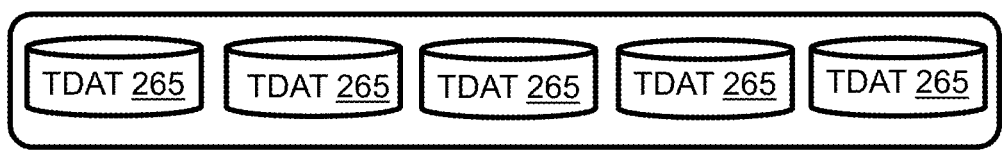
Figure 2:
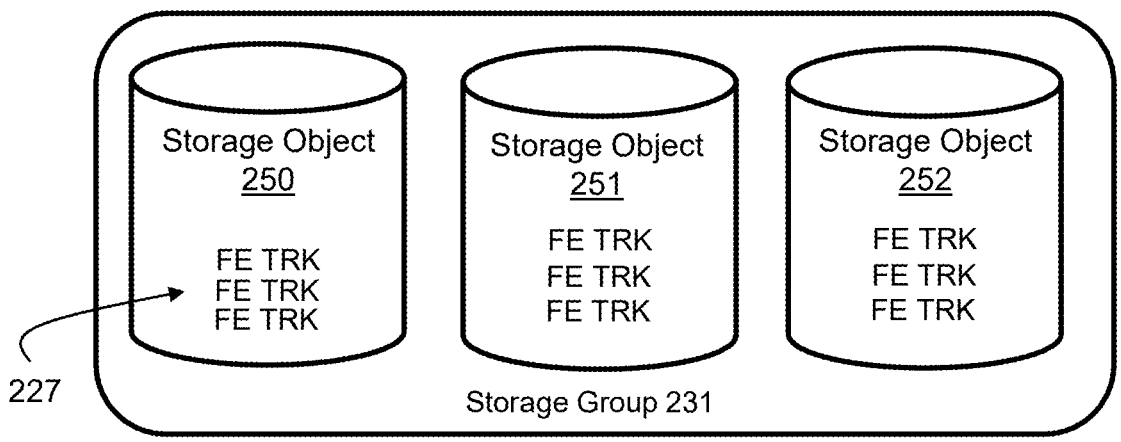

Referring to FIGS. 1 and 2, data associated with instances of the host applications running on the host servers 150 is maintained on the managed drives 101. The managed drives are not discoverable by the host servers, so the storage array creates logical production storage objects 250, 251, 252 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses distributed across multiple managed drives 101.

The compute nodes maintain metadata that maps between the logical block addresses of the production storage objects 250, 251, 252 and physical addresses on the managed drives 101 in order to process IOs from the host servers. The basic allocation unit of storage capacity that is used by the compute nodes 112 to access the managed drives 101 is a back-end track (BE TRK). The managed drives are organized into same-size splits 201, each of which may contain multiple BE TRKs. A grouping of splits 201 from different managed drives 101 is used to create a RAID protection group 207 with each split containing a protection group member. A storage resource pool 205 is a type of storage object that includes a collection of protection groups of the same RAID level, e.g., RAID-5 (3+1), on thinly provisioned logical data devices (TDATs) 265 that are used to create the production storage objects 250, 251, 252. The host application data is logically stored in front-end tracks (FE TRKs) on the production storage objects. The FE TRKs of the production storage objects are mapped to the BE TRKs on the managed drives and vice versa by tables and pointers that are maintained in the shared memory.

A collection of production storage objects 250, 251, 252 associated with a single host application is known as a storage group 231. The storage group may be a replication consistency group, and the data stored therein may be referred to as a host application image. Multiple instances of a single host application may use the same storage group, but instances of different host applications do not use the same storage group. The storage array may maintain any number of storage groups, e.g., one per supported host application. Each storage group is associated with a performance-defining service level. Different host applications have different requirements in terms of maximum acceptable data access latency. Within the storage array, each service level is defined by a target data access latency measured from receipt of an IO from a host to transmission of data or an acknowledgement to the host in response to the IO. The target data access latency is typically less than the maximum acceptable data access latency for the host application. The service level associated with a storage group may be selected based on the requirements or performance goals of the host application that uses the storage group. Multiple storage groups may be associated with the same service level.

FIG. 3 illustrates a time series guided service level core profile 202 and event guided service level core profiles 204. Service levels (SLs) supported by the storage array are listed in order of decreasing performance from diamond to bronze. Processor core clock speeds from 3000 Mhz to 1000 Mhz for the service levels are listed in the next column of the time series guided service level core profile 202. Allocations of processor cores and their clock speeds for performance emphasis (Perf) and power savings emphasis (Pwr) are listed in the next column of the event guided service level core profiles 204. For example, 24 cores running at 3000 MHz are allocated to diamond in the performance emphasis configuration, whereas 12 cores running at 1000 MHz are allocated to diamond in the power saving emphasis configuration. Corresponding target IO processing response times in milliseconds are listed in the next column. Listed in subsequent columns are the corresponding IOs per second (IOPS) per core processing capacity and power consumption in watts for the service levels. Processor core power consumption is directly related to clock speed and IOPS capacity, and inversely related to response time. Increasing clock speed increases core IOPS capacity and also increases power consumption but decreases response time. Decreasing clock speed decreases core IOPS capacity and also decreases power consumption but increases response time. The illustrated values are merely to provide context and are not to be viewed as limiting. For example, the clock speeds of all cores are not necessarily at maximum for a performance emphasis profile and at minimum for power savings emphasis profile. In some implementations the clock speeds and event profiles are user-defined.

Figure 4:
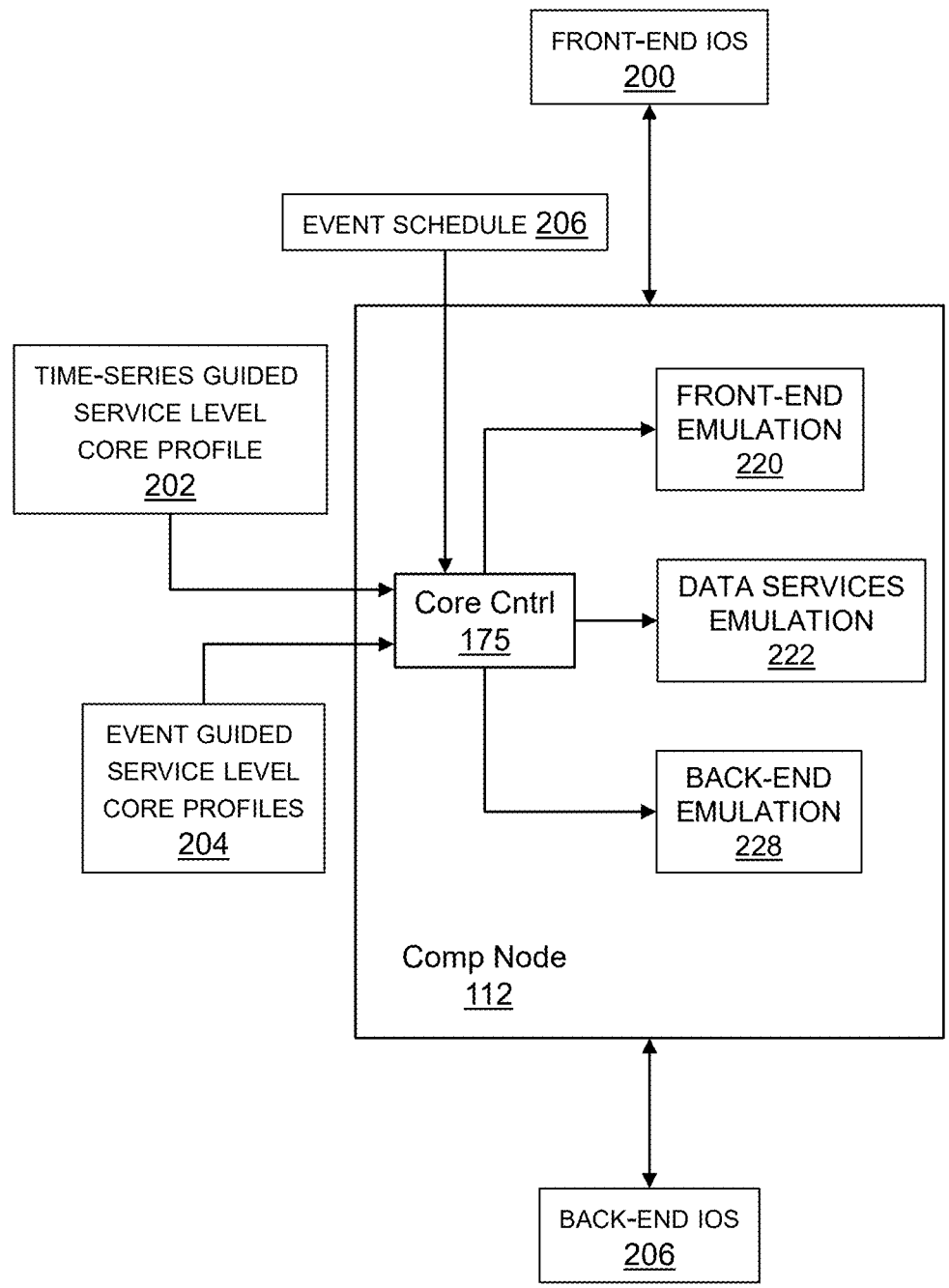
FIG. 4 illustrates emulations running on the compute nodes.

Referring to FIGS. 1 and 4, each compute node 112 runs emulations for completing different storage-related tasks and functions. A front-end emulation 220 handles communications with the host servers 150. For example, the front-end emulation receives IO commands 200 from host servers and returns data and write acknowledgements to the host servers. Each front-end emulation has exclusively allocated resources for servicing IOs from the host servers. The exclusively allocated resources include processor cores and may also include volatile memory and ports via which the hosts may access the storage array. The back-end emulation 228 handles back-end IOs 206 to access the managed drives 101 in the DAEs 160, 162. Each back-end emulation has exclusively allocated resources for accessing the managed drives. The exclusively allocated resources include processor cores and may also include volatile memory and ports. The data services emulation 222 processes IOs 200, 206, such as by creating, using, and updating the metadata that maps between logical block addresses of the storage objects to which IOs from the host applications are directed and the physical addresses on the managed drives. The data services emulation maintains the shared memory in which data is temporarily copied to service IOs. For example, Read IOs characterized as "read-miss" prompt the data services emulation to cause a back-end emulation to copy the data from the managed drives into the shared memory. The data services emulation then causes the front-end emulation to return the data to the host application. In the case of a "read-hit" in which the data is already in shared memory when the IO is received, the data is accessed from the shared memory without being copied from the managed drives by the back-end emulation in response to the IO. Write IOs prompt the data services emulation to copy the data into the shared memory, generate a write acknowledgement, and eventually prompt a back-end emulation to destage the data to the managed drives. Each data services emulation has exclusively allocated resources for servicing IOs from the host servers. The exclusively allocated resources include processor cores and may also include volatile memory and ports via which the hosts may access the storage array. Each emulation includes a process with multiple worker threads. The core matrix controllers 175 distribute exclusive allocations of individual processor cores to individual emulations. Further, the core matrix controllers 175 configure pools of the processor cores with clock speeds corresponding to the service levels defined in the service level core profile 202 and the event guided service level core profiles 204. As will be explained below, the processor core configurations may be represented as a core matrix.

Figure 5:
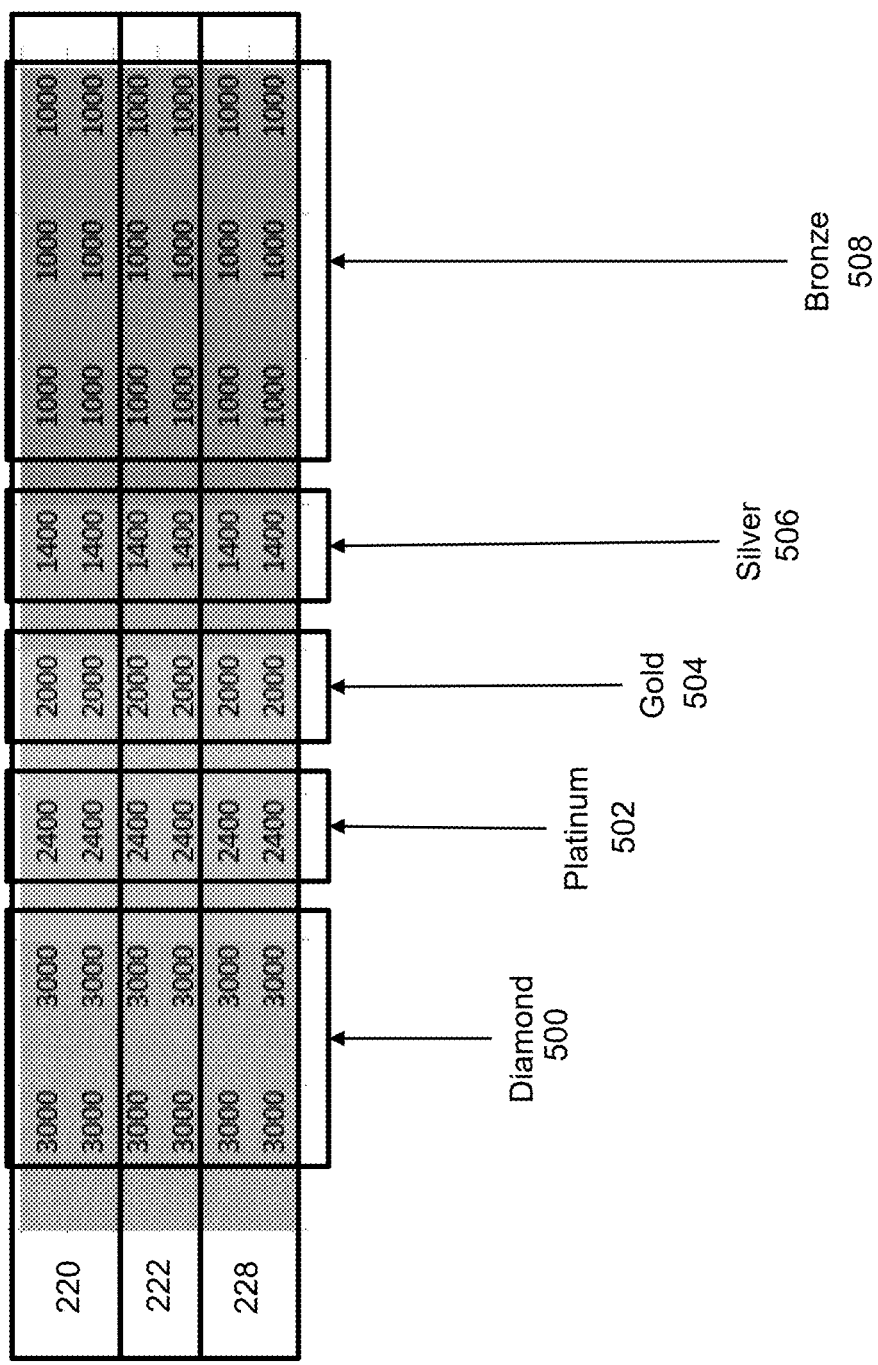
FIG. 5 illustrates a core matrix.

FIG. 5 illustrates a core matrix. The core matrix defines allocations of processor cores to the front-end emulation 220, data services emulation 222, and back-end emulation 228, and configurations of pools 500, 502, 504, 506, 508 of the processor cores corresponding to the supported service levels, namely, diamond, platinum, gold, silver, bronze in the illustrated example. Each cell in the matrix represents a single processor core, with the number value representing the clock speed of the core as defined in the service level core profile. In the illustrated example, cores in the diamond pool 500 have a clock speed of 3000 MHz, cores in the platinum pool 502 have a clock speed of 2400 MHz, cores in the gold pool 504 have a clock speed of 2000 MHz, cores in the silver pool 506 have a clock speed of 1400 MHz, and cores in the bronze pool 508 have a clock speed of 1000 MHz. Processor cores may be evenly distributed among the emulations 220, 222, 228 within each pool. However, different pools may have different numbers of processor cores. In the illustrated example, the diamond pool 500 has twelve cores, the platinum pool 502 has six cores, the gold pool 504 has six cores, the silver pool 506 has six cores, and the bronze pool 508 has eighteen cores.

When a host IO is received by the storage array, it is assigned to the pool corresponding to the service level of the storage group to which the IO is directed. For example, a host IO to a production storage object in a platinum level storage group is assigned to the platinum pool 502 of cores for processing. That IO could be initially processed by a first core in the platinum pool allocated to the front-end emulation 220, then processed by a second core in the platinum pool allocated to the data services emulation 222, processed by a third core in the platinum pool allocated to the back-end emulation 224, and so forth. By defining suitable clock speeds for the service levels and distributing suitable numbers of cores to the corresponding pools it is possible to facilitate maintenance of compliance with the service level requirements while reducing processor power consumption relative to running all cores at maximum clock speed without core-to-service level affiliations.

Figure 6:
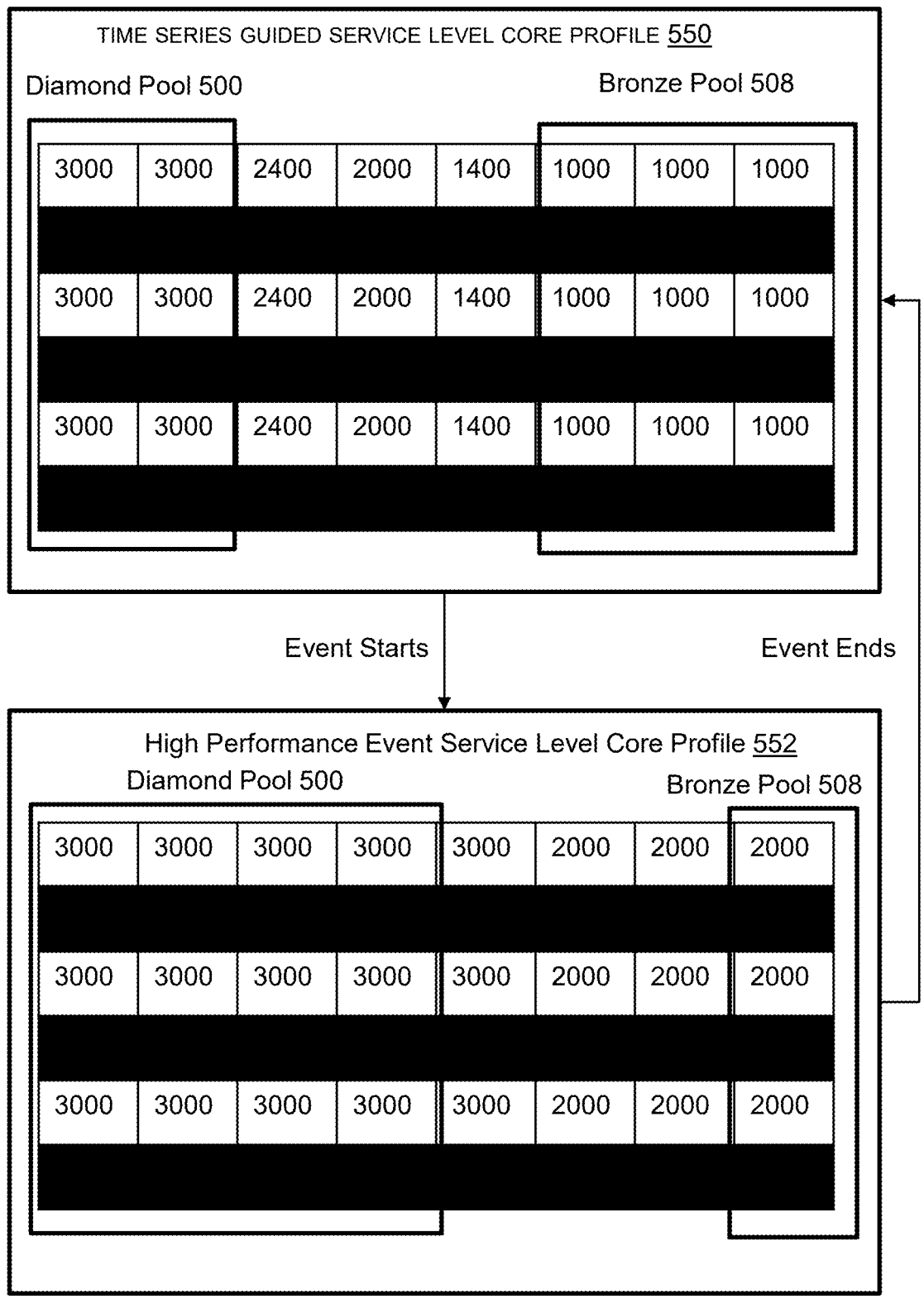
FIG. 6 illustrates transitions between a time series guided service level core profile and an event guided service level core profile.

FIG. 6 illustrates transitions between a time series guided service level core profile 550 and an event guided service level core profile 552. When operating under the time series guided service level core profile 550 the clock speeds of cores are set according to pool affiliation and the numbers of cores affiliated with each pool is dynamically adjusted based on time series modelling of IO processing latency. At the start of a scheduled event, the corresponding event guided service level core profile 552 overrides the current core allocations. When operating under the event guided service level core profile 552, the clock speeds of cores and the numbers of cores affiliated with each pool are set according to the event guided service level core profile 552. In other words, the clock speeds and core affiliations are adjusted to fit profile 552 until the event ends. In the illustrated example, the diamond pool 500 transitions from 12 cores at 3000 MHz to 24 cores at 3000 MHz while the bronze pool 508 transitions from 18 cores at 1000 MHz to 6 cores at 2000 MHz. At the end of the scheduled event, the time series guided service level profile is implemented, e.g., by restoring processor core configurations to the state just prior to the event start. For a scheduled event, both the start time and the end time are predetermined. Examples of scheduled events might include data backups, weekends, holidays, and so forth.

Figure 7:
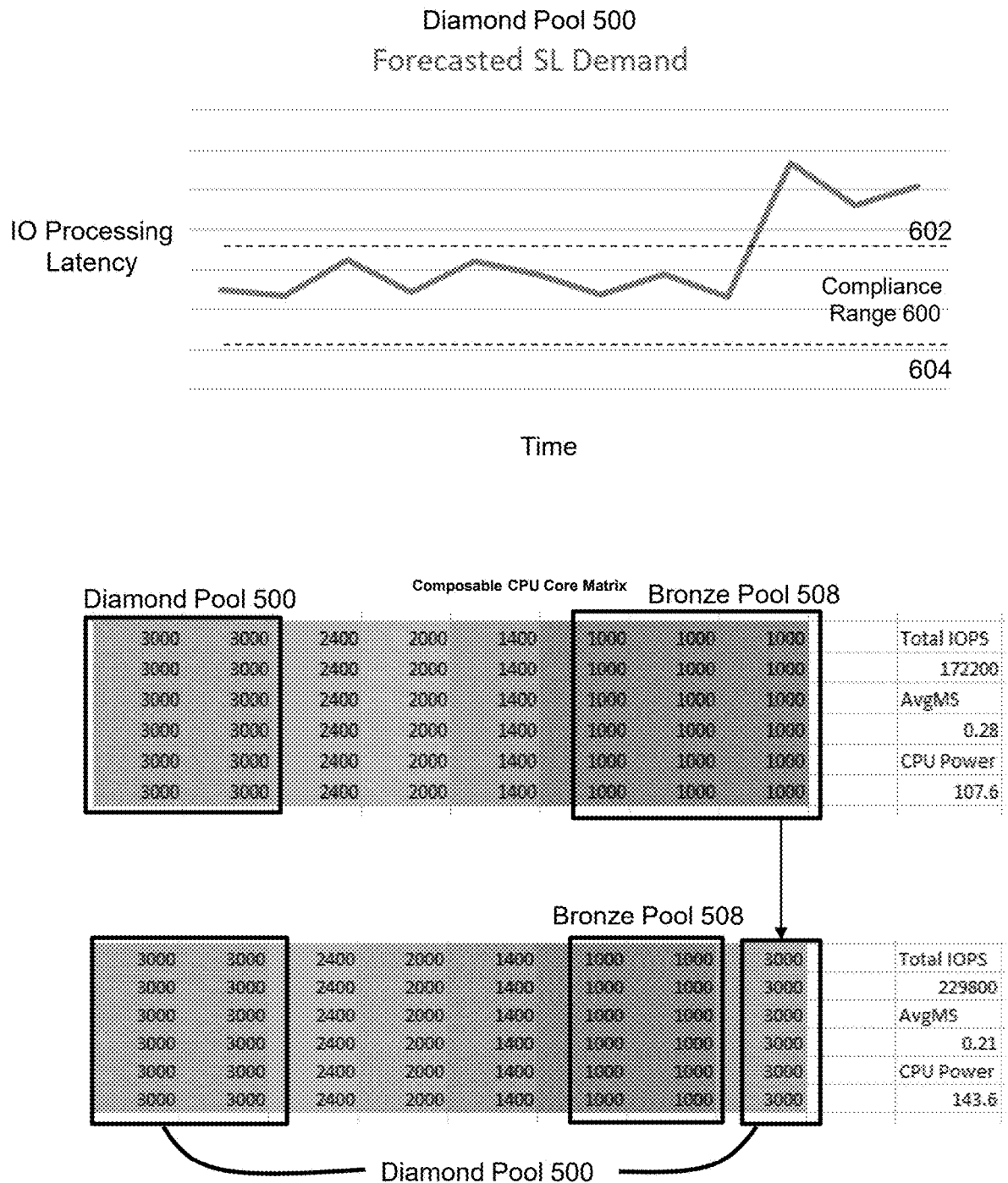
FIG. 7 illustrates autonomous core matrix modification in response to forecast increase in latency beyond a compliance range.
Figure 8:
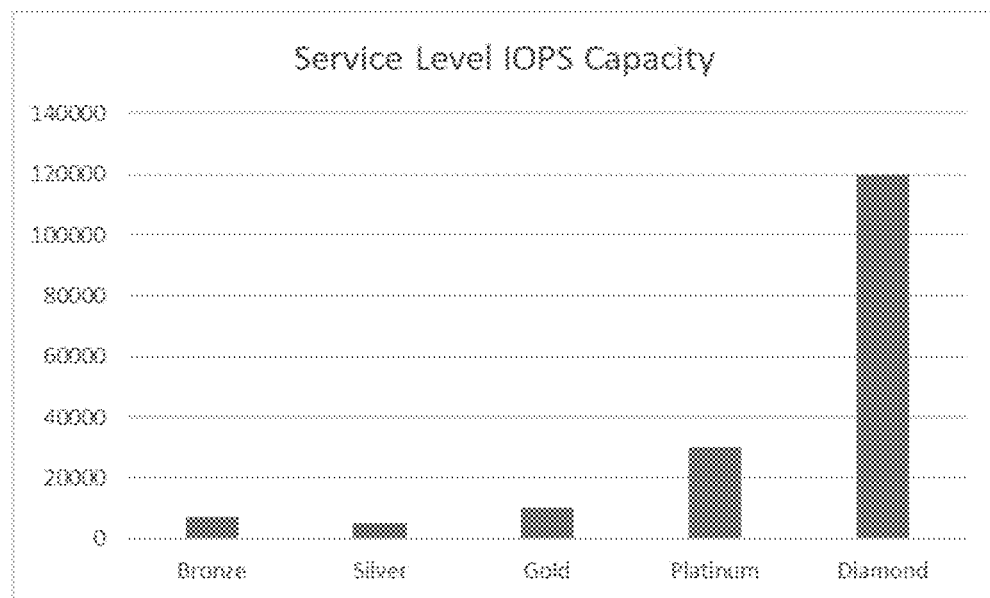
FIG. 8 illustrates the change in service level IOPS capacity resulting from the autonomous core matrix modification illustrated in FIG. 7.
Figure 8:
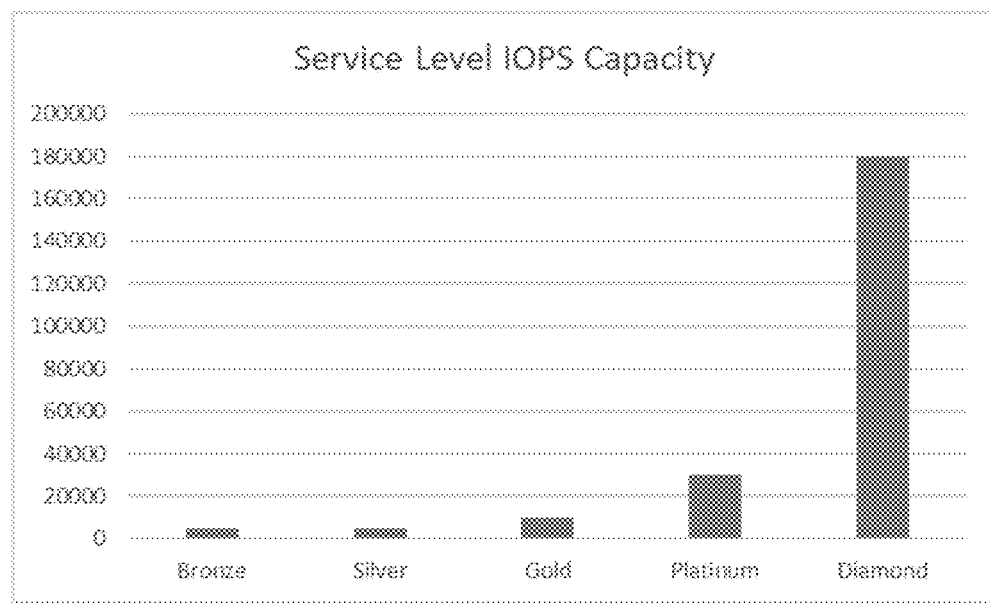

FIG. 7 illustrates autonomous core matrix modification in response to forecast increase in IO processing latency beyond a compliance range 600. The compliance range 600 is defined by an upper limit 602 corresponding to the maximum acceptable IO processing latency of the service level and a lower limit 604 corresponding to a minimum acceptable IO processing latency of the service level for purposes of power conservation. The target IO processing latency of the service level as defined in the service level core profile may be between the upper limit and the lower limit, which may be computed as a function of the target IO processing latency. The core matrix controllers 175 compute a forecast of IOPS demand on each service level and thus each pool based on any of a wide variety of predictive techniques known in the art. The IO processing latency of the pool corresponding to that IOPS demand is computed. The IO processing latency may be scaled relative to an average transfer size to prevent large block IOs from skewing results. If the forecast IO processing latency on a pool is outside the compliance range for that pool, then core allocations are adjusted, e.g., before IO processing latency is outside the compliance range 600. In the illustrated example the forecast indicates that increase in IOPS demand on the diamond pool 500 will cause the IO processing latency to exceed the upper limit 602. In response, the core matrix controller increases the allocation of cores to the diamond pool 500 by promoting cores from a lower performing pool. More specifically, from 1-N cores per emulation are promoted from the lowest performing pool from which cores are available, which in the illustrated example is the bronze pool 508. Equal numbers of cores are promoted and allocated to each emulation. Promotion of the cores includes adjustment of clock speed to match the clock speed defined for the target pool in the service level core profile. In the illustrated example six cores are promoted from the bronze pool 508 to the diamond pool 500 so each of those cores has its clock speed increased from 1000 MHz to 3000 MHz. As a result, total IOPS capacity of the core matrix increases while power consumption increases, and latency is reduced. As shown in FIG. 8, the IOPS capacity of the bronze pool decreases as the IOPS capacity of the diamond pool increases as a result of the core promotions from the bronze pool to the diamond pool. Core promotions can be performed iteratively until IO processing latency under the forecast demand is within the compliance range by a computed amount, e.g., until forecast IOPS demand is less than 80% of IOPS capacity for the service level.

Figure 9:
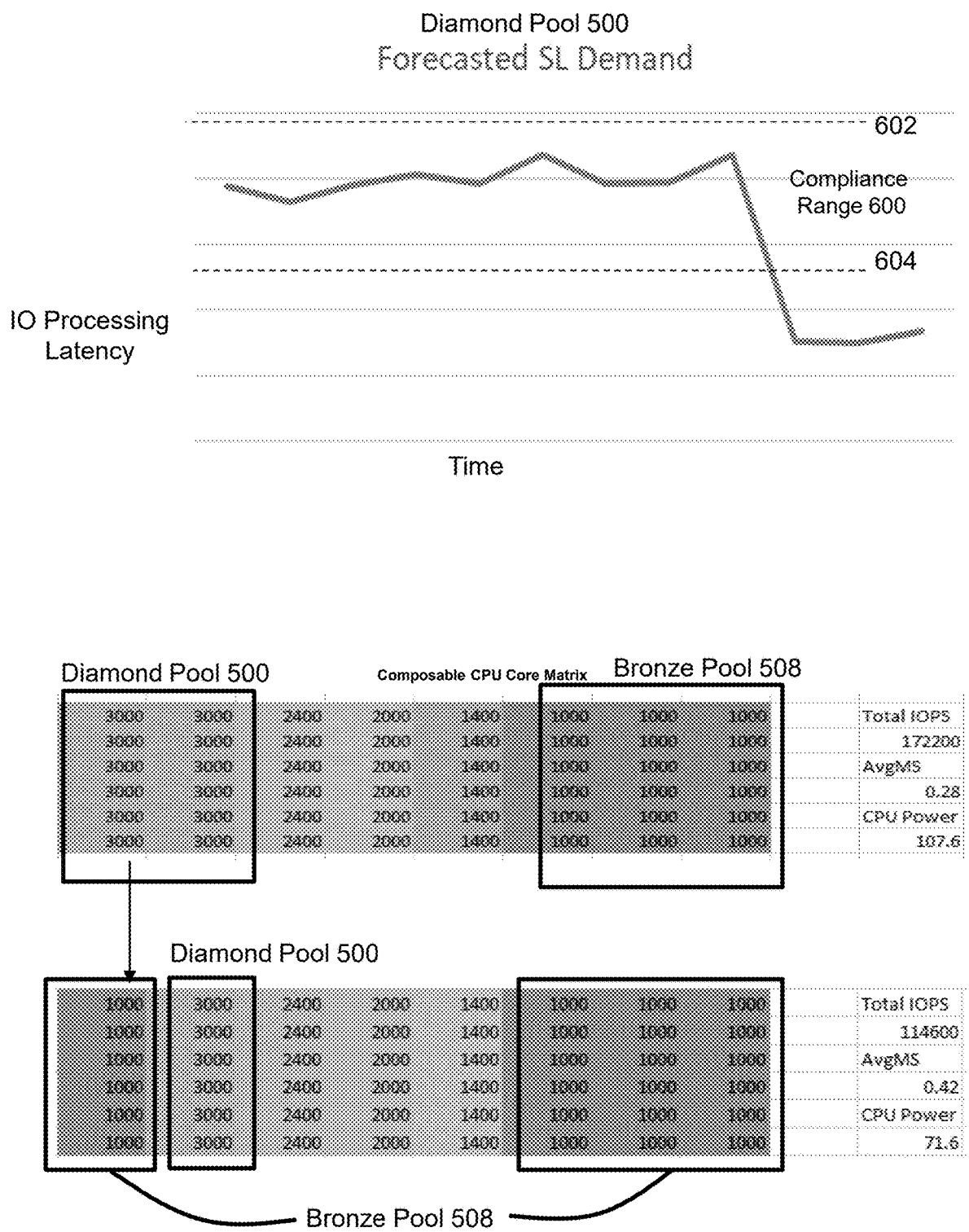
FIG. 9 illustrates autonomous core matrix modification in response to forecast decrease in latency beyond the compliance range.

FIG. 9 illustrates autonomous core matrix modification in response to forecast decrease in latency beyond the compliance range 600. In the illustrated example the forecast indicates that decrease in IOPS demand on the diamond pool 500 will cause the IO processing latency to fall below the lower limit 604. In response, the core matrix controller decreases the allocation of cores to the diamond pool 500 by demoting cores to a lower performing pool. More specifically, cores are demoted to the lowest performing pool, which in the illustrated example is the bronze pool 508. Equal numbers of cores are demoted from each emulation. Demotion of the cores includes adjustment of clock speed to match the clock speed defined for the target pool in the service level core profile. In the illustrated example, six cores are demoted from the diamond pool to the bronze pool so each of those cores has its clock speed decreased from 3000 MHz to 1000 MHz. As a result, total IOPS capacity of the core matrix decreases while power consumption decreases, and latency increases. Core demotions can be performed iteratively until IO processing latency under the forecast IOPS demand is within the compliance range by a computed amount, e.g., until forecast IOPS demand is greater than 60% of IOPS capacity.

Figure 10:
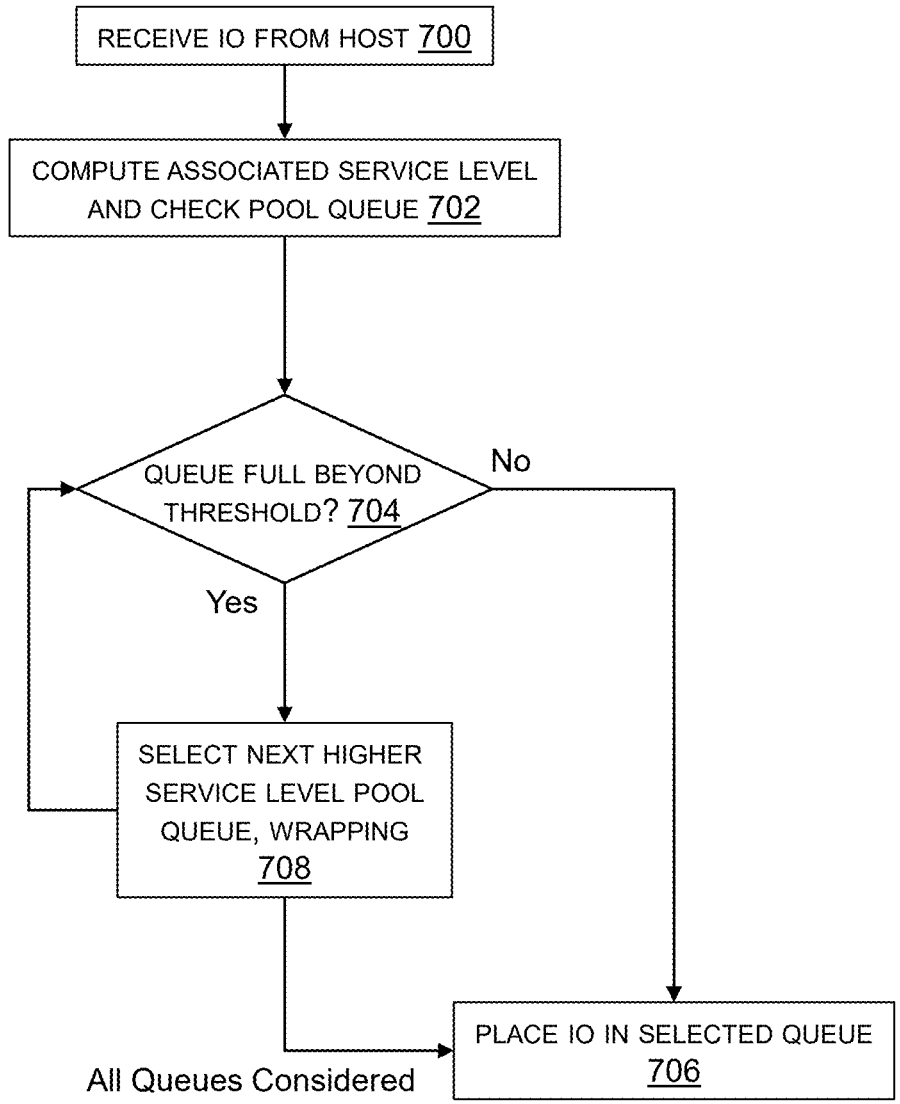
FIG. 10 illustrates assignment of IOs to service level pool cores.

FIG. 10 illustrates assignment of IOs to processor cores. In response to receipt of an IO from a host in step 700, the storage array computes the service level associated with the IO and checks the state of the queue for the associated pool. The service level may be computed by identifying the service level associated with the storage group of which the target storage object of the IO is a member. Each pool of cores has a single input queue via which IOs are enqueued for processing, e.g., one queue for the diamond pool, one queue for the platinum pool, and so forth. IOs are removed from the queue as they are processed. Queue thresholds that are less than the queue size are computed for each queue. The thresholds may be derived from the core profile. For example, each diamond core might contribute a value of 100 to the diamond queue threshold, whereas each bronze core only might contribute a value of 10 to the bronze queue threshold. If the queue for the pool corresponding to the service level of the target storage object is not full beyond the threshold as determined in step 704, then the IO is placed in that queue as indicated in step 706. If the queue for the pool corresponding to the service level of the target storage object is over the threshold as determined in step 704, then the pool corresponding to the next higher service level is selected as indicated in step 708. If there are no higher service level pools, then selection wraps to the lowest service level pool queue. The selected queue is then tested for fullness in step 704. Steps 704 and 708 are iterated until an available queue is found or until all queues have been considered, whichever occurs first. If all queues are full beyond their thresholds, then the IO is enqueued in the queue for the pool corresponding to the service level of the target storage object in step 706.

Figure 11:
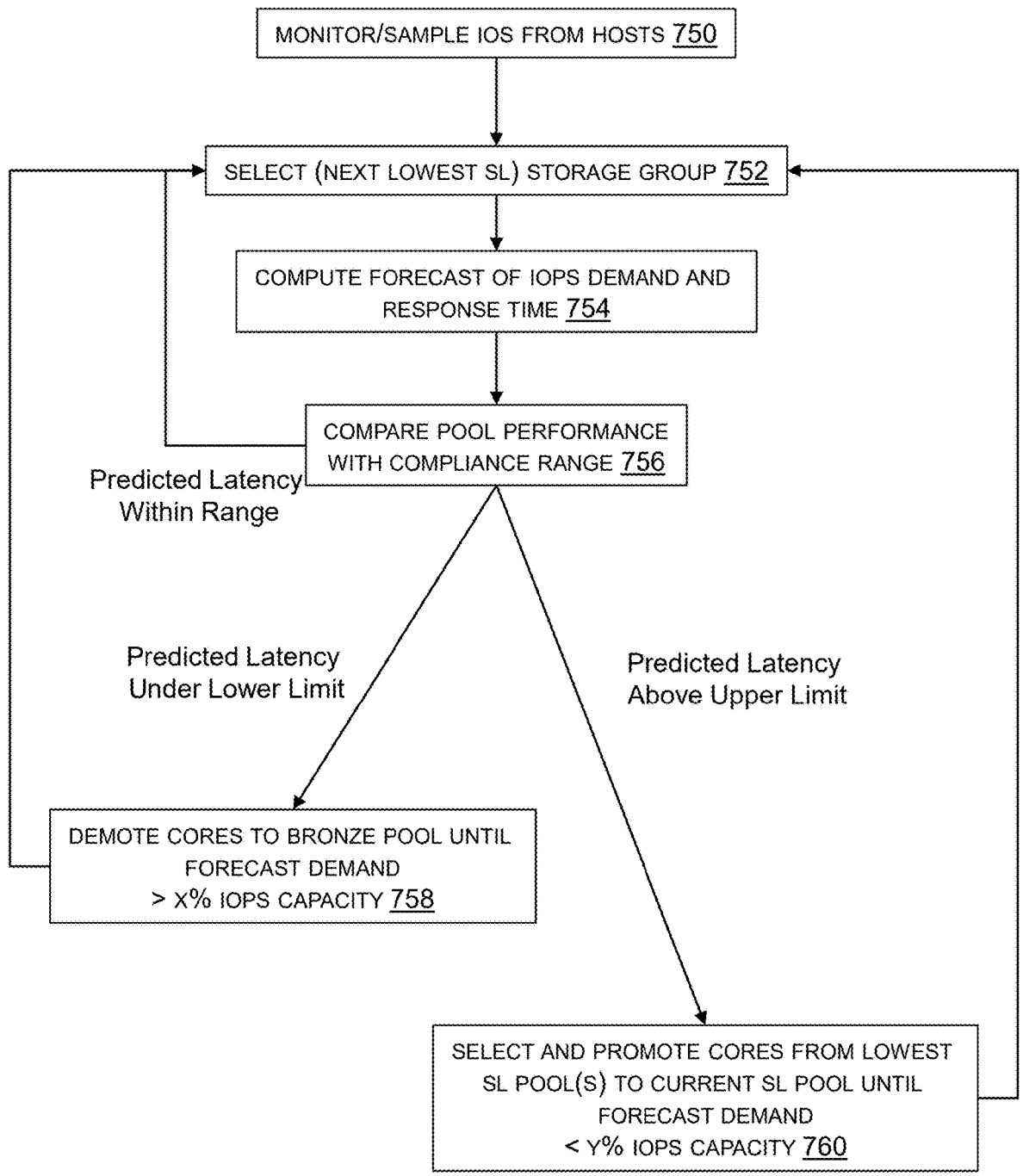
FIG. 11 illustrates a method of autonomous core matrix modification based on time series forecasts.

FIG. 11 illustrates a method of autonomous core matrix modification. IOs received by the storage array from hosts are monitored continuously or sampled as indicated in step 750. Forecasts and adjustments may be performed periodically. In each epoch, adjustments are performed on the pools serially, in order from highest performing to lowest performing service level. A storage group is selected in step 752. Specifically, the highest performing storage group is selected for the first iteration of the epoch and the next lowest performing storage group as defined by service level for each subsequent iteration. A forecast of IOPS demand and response time for the selected storage group are computed in step 754. If there are multiple storage groups at the same service level, then the computations may be combined. In step 756 the computed performance of the corresponding pool under the forecast IOPS demand is compared with the compliance range. If the pool performance is within the compliance range, e.g., in terms of predicted data access latency, then the next lowest performing storage group is selected in step 752. If the predicted latency is under the lower latency limit, then cores are demoted from the pool under consideration to the bronze pool until forecast IOPS demand is greater than X % of IOPS capacity, e.g., where X=60. The next lowest performing storage group is then selected in step 752. If the predicted latency is above the upper latency limit, then cores are promoted from the lowest performing pool from which cores are available, e.g., bronze, until forecast IOPS demand is less than Y % of IOPS capacity, e.g., where Y=80. The next lowest performing storage group is then selected in step 752. The steps continue until all service levels/storage groups have been processed. The next epoch begins at step 750.

Figure 12:
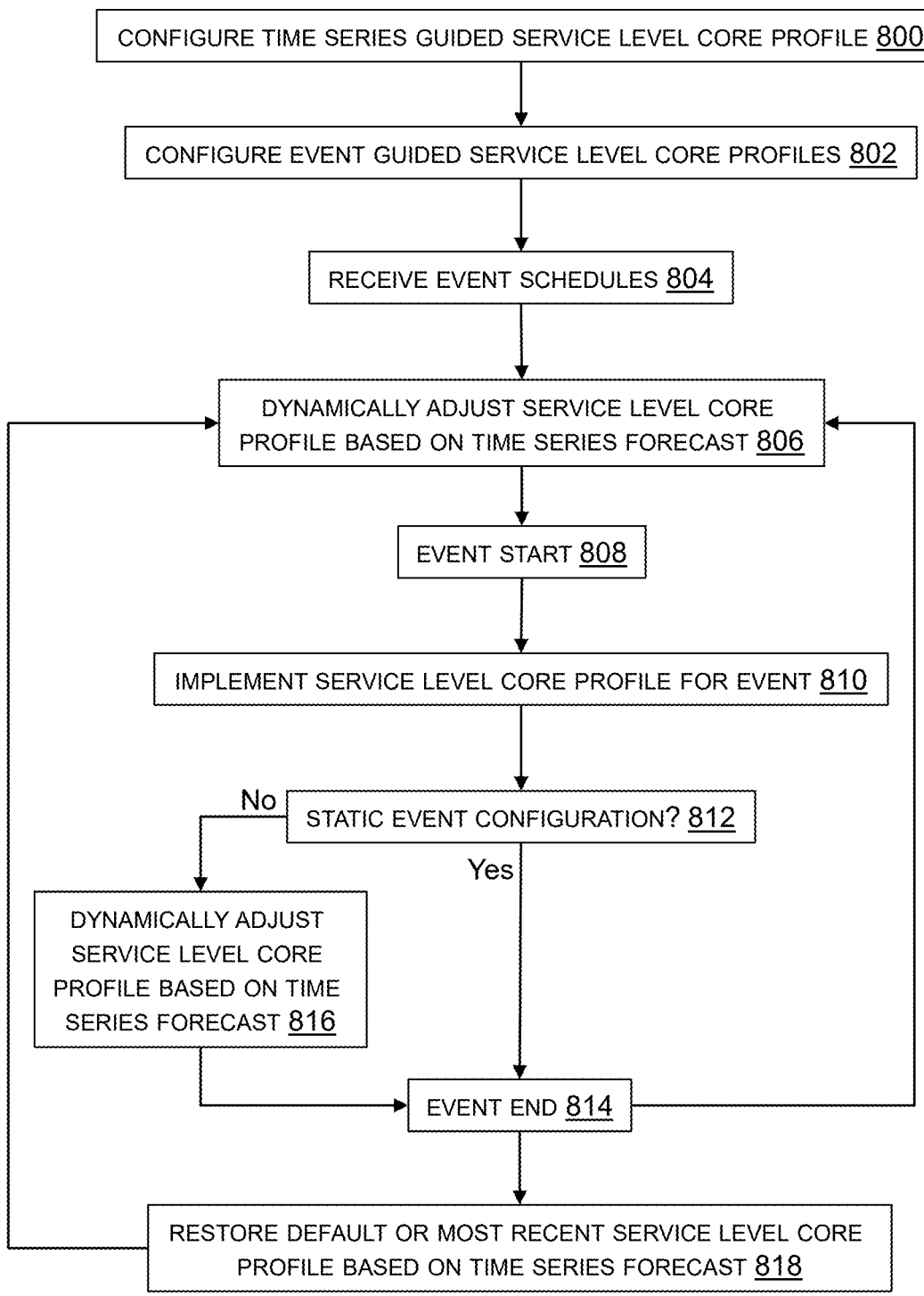
FIG. 12 illustrates a method of processor core reconfiguration based on time series forecasts with scheduled events.

FIG. 12 illustrates a method of processor core reconfiguration based on time series forecasts and scheduled events. A time series guided service level core profile is configured in step 800. The relationships between processor core clock speeds and pools are static in the time series guided service level core profile, but the assignment of cores to pools is dynamically adjusted based on time series modelling. Event guided service level core profiles are configured in step 802. The relationships between processor core clock speeds and pools may differ for each profile type of the event guided service level core profiles. Event schedules are received in step 804. An event schedule could indicate, for example, that an even requiring a performance emphasis core matrix profile is to be implemented starting on a specified date and time and ending on a specified date and time. The default system state may be time series guided. Service level core profiles are dynamically adjusted based on time series forecasting in step 806. This may continue in multiple iterations of adjustments based on forecasts between scheduled events. A scheduled event starts at step 808. The service level core profile corresponding to the event is implemented at step 810. If the service level core profile for the event is static as determined at step 812, then the corresponding core matrix including clock speeds and core-to-pool affiliations are statically maintained until the event ends in step 814. If the service level core profile for the event is not static as determined at step 812, then the core matrix corresponding to the event is dynamically adjusted based on time series forecasts as indicated in step 816 until the event ends in step 814. At the end of the event a default core matrix profile or the most recent time series guided core matrix profile is implemented in step 818. Optionally, the core matrix profile is gradually adjusted by transitioning to dynamic adjustment based on time series forecasts.

Although advantages are not considered necessary to any embodiments, some embodiments may help decrease energy consumption by processor cores of a storage system while maintaining compliance with service level obligations by adjusting core affiliations and clock speeds. Typical storage systems operate with all cores at maximum clock speed. Because the storage-related services are performed by emulations, cores can be allocated to individual emulations and performance pools. Aligning the performance pools with the service levels, e.g., in terms of IOPS capacity, enables some cores to operate at lower power levels in support of lower performing service levels without adversely affecting higher performing service levels. Event profiles enable rapid reconfiguration of processor cores in a manner that is not practical to achieve with only time series forecasting.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
using time series forecasts to dynamically adjust allocations of processor cores to pools in a storage system such that the processor cores within each of the pools run at a single reduced clock speed defined for a service level corresponding to the respective pool; and
overriding time-series forecast adjusted allocations of the processor cores to the pools during a scheduled event by configuring the processor cores according to an event guided service level core profile.

2. The method of claim 1 further comprising setting processor core clock speeds according to the event guided service level core profile.

3. The method of claim 2 further comprising allocating the processor cores according to the event guided service level core profile.

4. The method of claim 3 further comprising dynamically adjusting the event guided service level core profile allocations of processor cores to pools using time series forecasts during the event.

5. The method of claim 3 further comprising restoring most recent time series forecast adjusted allocations of the processor cores to pools at the end of the event.

6. The method of claim 3 further comprising restoring default allocations of the processor cores to pools at the end of the event.

7. The method of claim 3 further comprising preconfiguring a plurality of event guided service level core profiles.

8. An apparatus comprising:
a storage system comprising at least one compute node configured to manage access to at least one non-volatile drive, the compute node comprising hardware resources including multi-core processors and memory, the storage system configured with a plurality of pools of processor cores, each pool corresponding uniquely to a supported service level of the storage system; and
a core matrix controller adapted to:
use time series forecasts to dynamically adjust allocations of processor cores to pools in a storage system such that the processor cores within each of the pools run at a single reduced clock speed defined for a service level corresponding to the respective pool; and
override time-series forecast adjusted allocations of the processor cores to the pools during a scheduled event by configuring the processor cores according to an event guided service level core profile.

9. The apparatus of claim 8 further comprising the core matrix controller adapted to set processor core clock speeds according to the event guided service level core profile.

10. The apparatus of claim 9 further comprising the core matrix controller adapted to allocate the processor cores according to the event guided service level core profile.

11. The apparatus of claim 10 further comprising the core matrix controller adapted to dynamically adjust the event guided service level core profile allocations of processor cores to pools using time series forecasts during the event.

12. The apparatus of claim 10 further comprising the core matrix controller adapted to restore most recent time series forecast adjusted allocations of the processor cores to pools at the end of the event.

13. The apparatus of claim 10 further comprising the core matrix controller adapted to restore default allocations of the processor cores to pools at the end of the event.

14. The apparatus of claim 10 further comprising the core matrix controller preconfigured with a plurality of event guided service level core profiles.

15. A non-transitory computer-readable storage medium storing instructions that when executed by a computer perform a method comprising:

using time series forecasts to dynamically adjust allocations of processor cores to pools in a storage system such that the processor cores within each of the pools run at a single reduced clock speed defined for a service level corresponding to the respective pool; and overriding time-series forecast adjusted allocations of the processor cores to the pools during a scheduled event by configuring the processor cores according to an event guided service level core profile.

16. The non-transitory computer-readable storage medium of claim 15 in which the method further comprises setting processor core clock speeds according to the event guided service level core profile.

17. The non-transitory computer-readable storage medium of claim 16 in which the method further comprises allocating the processor cores according to the event guided service level core profile.

18. The non-transitory computer-readable storage medium of claim 17 in which the method further comprises dynamically adjusting the event guided service level core profile allocations of processor cores to pools using time series forecasts during the event.

19. The non-transitory computer-readable storage medium of claim 17 in which the method further comprises restoring most recent time series forecast adjusted allocations of the processor cores to pools at the end of the event.

20. The non-transitory computer-readable storage medium of claim 17 in which the method further comprises restoring default allocations of the processor cores to pools at the end of the event.

\* \* \* \* \*